April 29, 1930.  H. A. RAYMOND  1,756,474
RUBBER FOOTWEAR ARTICLE AND METHOD OF MAKING
Filed Oct. 25, 1927

INVENTOR
Howard A. Raymond
BY
ATTORNEY

Patented Apr. 29, 1930

1,756,474

UNITED STATES PATENT OFFICE

HOWARD A. RAYMOND, OF SOMERVILLE, MASSACHUSETTS, ASSIGNOR TO AMERICAN RUBBER COMPANY, OF EAST CAMBRIDGE, MASSACHUSETTS, A CORPORATION OF MASSACHUSETTS

RUBBER FOOTWEAR ARTICLE AND METHOD OF MAKING

Application filed October 25, 1927. Serial No. 228,704.

This invention relates to a rubber footwear article, more particularly to a footwear article having an imitation fabric upper, and to its method of manufacture.

Rubber footwear articles with exterior fabric or composition fabric and rubber uppers have been widely used in the past, but generally in the making of relatively heavy articles for winter use, such as arctics, etc. More recently such articles have been manufactured in various ornamental color and pattern designs, more particularly intended for ladies' use. However, in order to render these articles thoroughly waterproof, the exterior fabric uppers must be quite heavily backed with rubber or rubberized material, and as a result they are more or less clumsy in appearance, stiff, heavy, and heating to the foot of the wearer. Hence they are not suitable for summer wear. In addition, they are easily soiled by mud, etc., particularly when the uppers are made of light colored fabric, and when so soiled they are difficult to clean in such a manner as to restore their original appearance.

An object of the present invention is to provide a rubber footwear article, the exterior of the upper of which is partly or wholly of rubber formed to closely simulate fabric in appearance, and which article is light in weight, flexible, thoroughly waterproof, relatively cool in use, and easily cleaned. Another object is to provide a rubber footwear article having a rubber printed rubber upper closely simulating the appearance of fabric. A further object is to provide a method for making the article.

Figure 1:
Figure 2:
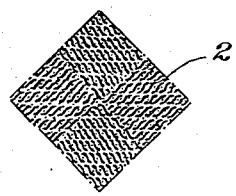

Referring to the attached drawing:

Fig. 1 is a side view of a footwear article made according to one form of the invention; and Fig. 2 is an enlarged detail view showing one form of printed rubber stock.

In one embodiment of the invention a suitable rubber stock may be sheeted and placed upon a temporary backing of sufficient inelasticity to prevent substantial stretching of the stock, and the stock then run through a printing machine by which it is printed in imitation of fabric, using any desired design and any color or colors which will contrast with the base color of the rubber stock. The ink used is preferably a rubber one, but the invention is not limited to this as any ink having the desired characteristics such as water insolubility, elasticity, etc., may be used. The stock after printing and drying may then be stripped from the backing and died out into the desired blanks for forming the footwear article, or instead, if a cheap backing has been used, the dieing operation may be carried out while the stock is still disposed on the backing and the latter then stripped from the individual died out parts as the parts are to be used. The footwear article, such as an overshoe, arctic, boot, etc., may then be built up upon a last in the usual manner, first applying the desired linings and reinforcements and then the imitation fabric rubber exterior parts 1 formed of the printed rubber stock 2, and the article then finished and vulcanized in the usual manner. Instead of this, the article may be built up by what is known as the "lay out" method in which the entire upper or certain component parts of the upper are first built up in the flat by superposing the various plies entering into the construction, and this entire built-up upper or built-up parts then disposed upon a last and finished by well known methods.

As an alternative, the desired rubber stock may be directly calendered upon a suitable lining material as a backing, usually an elastic net, and the composite sheet thus formed run through the printing machine and printed in imitation of fabric as before. The printed composite sheet may then be died or otherwise cut out into the desired blanks and the latter assembled upon a last as before. Where it is desired or necessary to reinforce the uppers made in this manner, this may be accomplished by applying external reinforcements of the printed-backed rubber stock alone or by using reinforcements of cheaper or stiffer material and covering these with portions of the printed material. While this variation of the method has certain advantages in reducing the number of operations, the scrap produced in cutting out the parts is, of course, a composite fabric and rubber scrap which has less value than a scrap composed entirely of rubber, since it cannot be reused except by submitting it to a relatively expensive process to reclaim the rubber or by grinding up the composite material to form what is known as rag stock.

Footwear articles made according to the present invention are particularly adapted for summer wear or in warm climates, although they are not limited to such use, since by reason of their lightness, flexibility, elasticity and coolness they can be comfortably worn during summer rains without personal inconvenience. The printed rubber exterior upper closely simulates fabric in appearance and by using various colored base stocks and inks and varying the design many pleasing color combinations and imitations of various fabrics, etc., can be obtained. When soiled, the articles may be readily cleaned and restored to their original apearance by merely washing with water. The invention is, of course, not limited to making footwear articles having fabric or other linings, since it can be also applied in the making of unlined footwear articles such as bathing shoes or unlined overshoes, nor is it essential that the entire upper of the article be formed of the fabric imitation stock.

Having thus described my invention what I claim and desire to protect by Letters Patent is:

1. A method of manufacturing waterproof footwear which consists in forming a thin layer of rubber composition, printing upon the exposed surface of the same while supported against stretching, assembling the constituents of footwear to form a shoe with said layer forming the exterior of the upper and vulcanizing.

2. A method of making waterproof footwear articles, which comprises rubber printing unvulcanized sheet rubber stock in imitation of fabric, assembling the articles with at least a portion of its upper exteriorly formed of said stock, and vulcanizing.

Signed at Cambridge, county of Middlesex, State of Massachusetts, this 20th day of October, 1927.

HOWARD A. RAYMOND.